(12) United States Patent
Wollenweber

(10) Patent No.: US 8,837,799 B2
(45) Date of Patent: Sep. 16, 2014

(54) METHOD AND APPARATUS FOR SELECTING A REFERENCE GATE

(75) Inventor: Scott David Wollenweber, Waukesha, WI (US)

(73) Assignee: General Electric Company, Schenectady, NY (US)

(*) Notice: Subject to any disclaimer, the term of this patent is extended or adjusted under 35 U.S.C. 154(b) by 162 days.

(21) Appl. No.: 13/600,997

(22) Filed: Aug. 31, 2012

(65) Prior Publication Data

US 2014/0064585 A1 Mar. 6, 2014

(51) Int. Cl.
*G06T 7/00* (2006.01)

(52) U.S. Cl.
USPC .......................................................... 382/131

(58) Field of Classification Search
None
See application file for complete search history.

(56) References Cited

U.S. PATENT DOCUMENTS

| 2008/0226149 A1* | 9/2008 | Wischmann et al. | 382/131 |
| 2009/0092305 A1* | 4/2009 | Ditt et al. | 382/131 |
| 2012/0051664 A1* | 3/2012 | Gopalakrishnan et al. | 382/294 |
| 2012/0078089 A1* | 3/2012 | Wollenweber et al. | 600/427 |
| 2013/0315459 A1* | 11/2013 | Wollenweber et al. | 382/131 |

OTHER PUBLICATIONS

Thielemans et al. "Robust Motion Correction for Respiratory Gated PET/CT Using Weighted Averaging." IEEE Nuclear Science Symposium and Medical Imaging Conference, Oct. 23, 2011, pp. 2964-2967.*
Manjeshwar et al. "Motion Compensated Image Reconstruction of Respiratory Gated PET/CT." 3rd IEEE International Symposium on Biomedical Imaging: Nano to Macro. Apr. 6, 2006, pp. 674-677.*
Asma et al. "Theoretical Comparison of Motion Correction Techniques for PET Image Reconstruction." IEEE Nuclear Science Symposium Conference Record, Oct. 29, 2006, pp. 1762-1767.*
Dawood et al. "Lung Motion Correction on Respiratory Gated 3-D PET/CT Images." IEEE Transactions on Medical Imaging, vol. 25, No. 4, Apr. 2006, pp. 476-485.*

* cited by examiner

*Primary Examiner* — Jon Chang
(74) *Attorney, Agent, or Firm* — Dean D. Small; The Small Patent Law Group

(57) ABSTRACT

A method for selecting a reference gate includes acquiring a four-dimensional (4D) emission dataset of an object of interest, sorting the 4D emission dataset into a plurality of gates, calculating a slice activity value for each slice in the plurality of gates, generating a maximum difference value for each gate using the plurality of slice activity values, and selecting a reference gate based on the locations of the maximum difference values. An imaging system and a non-transitory computer readable medium are also described herein.

20 Claims, 6 Drawing Sheets

METHOD AND APPARATUS FOR SELECTING A REFERENCE GATE

BACKGROUND OF THE INVENTION

The subject matter disclosed herein relates generally to imaging systems, and more particularly to a method and apparatus for selecting a reference gate to generate an image.

Multi-modality imaging systems exist that scan using different modalities, for example, Computed Tomography (CT), Magnetic Resonance Imaging (MRI), Positron Emission Tomography (PET), and Single Photon Emission Computed Tomography (SPECT). During operation, the image quality of the conventional imaging systems may be affected by the motion of the object being imaged. More specifically, imaging artifacts may be produced by movement of the object during image acquisition. Respiratory motion is a common source of involuntary motion in mammals (e.g., people and animals) encountered in medical imaging systems and therefore is also a common source of the imaging artifacts.

One known method for reducing the imaging artifacts is to sort the image data into a plurality of gates. One of the gates is then selected as the reference gate and the remaining gates are then registered to the reference gate. However, the reference gate may not include optimal information for registering the remaining gates. For example, the reference gate may include a fewer number of pixels or pixels having a reduced pixel intensity. Thus, when the remaining gates are registered with the reference gate, the quality of the resultant image may be reduced.

Another method for reducing the imaging artifacts may include requesting the patient to hold their breath during the scan. However, because PET data, for example, may be acquired over several minutes, the patient typically has to breathe several times during the PET acquisition. Thus the patient's breathing results in patient motion which may potentially result in imaging artifacts.

BRIEF DESCRIPTION OF THE INVENTION

In one embodiment, a method for selecting a reference gate is provided. The method includes acquiring a four-dimensional (4D) emission dataset of an object of interest, sorting the 4D emission dataset into a plurality of gates, calculating a slice activity value for each slice in the plurality of gates, generating a maximum difference value for each gate using the plurality of slice activity values, and selecting a reference gate based on the locations of the maximum difference values.

In another embodiment, an imaging system is provided. The imaging system includes a detector and a computer coupled to the detector. The computer is programmed to acquire a four-dimensional (4D) emission dataset of an object of interest, sort the 4D emission dataset into a plurality of gates, calculate a slice activity value for each slice in the plurality of gates, generate a maximum difference value for each gate using the plurality of slice activity values, and select a reference gate based on the locations of the maximum difference values.

In a further embodiment, a non-transitory computer readable medium is provided. The non-transitory computer readable medium is encoded with a program programmed to instruct a computer to acquire a four-dimensional (4D) emission dataset of an object of interest, sort the 4D emission dataset into a plurality of gates, calculate a slice activity value for each slice in the plurality of gates, generate a maximum difference value for each gate using the plurality of slice activity values, and select a reference gate based on the locations of the maximum difference values.

DETAILED DESCRIPTION OF THE INVENTION

Figure 1:
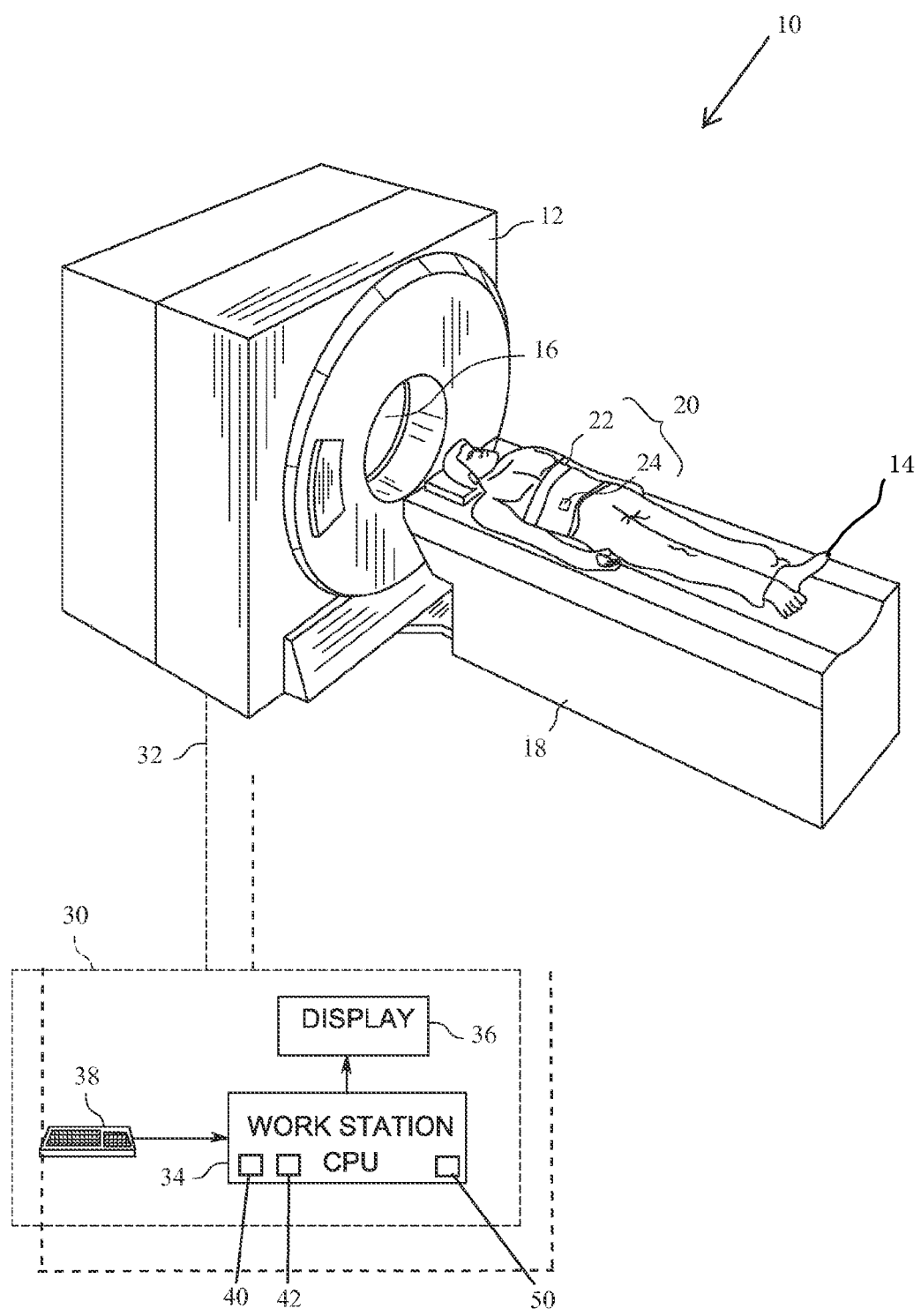
FIG. 1 is a pictorial illustration of an exemplary imaging system formed in accordance with various embodiments.

The foregoing summary, as well as the following detailed description of various embodiments, will be better understood when read in conjunction with the appended drawings. To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Also as used herein, the phrase "reconstructing an image" is not intended to exclude embodiments of the present invention in which data representing an image is generated, but a viewable image is not. Therefore, as used herein the term "image" broadly refers to both viewable images and data representing a viewable image. However, many embodiments generate, or are configured to generate, at least one viewable image.

Various embodiments described herein provide an imaging system 10 as shown in FIG. 1. In the illustrated embodiment, the imaging system 10 is a stand-alone positron emission tomography (PET) imaging system. Optionally, the imaging system 10 may be embodied, for example, as a stand-alone computed tomography (CT) imaging system, a magnetic resonance imaging (MRI) system, or a single photon emission computed tomography (SPECT) system. The various embodiments described herein are not limited to standalone imaging systems. Rather, in various embodiments, the imaging system 10 may form part of a multi-modality imaging system that includes the PET imaging system 10 and a CT imaging system, an MRI system, or a SPECT system, for example. Moreover, the various embodiments are not limited to medical imaging systems for imaging human subjects, but may include veterinary or non-medical systems for imaging non-human objects, etc.

Referring to FIG. 1, the imaging system 10 includes a gantry 12. The gantry 12 includes a detector 512 (shown in FIG. 8) that is configured to acquire emission data. During operation, a patient 14 is positioned within a central opening 16 defined through the gantry 12, using, for example, a motorized table 18. The imaging system 10 may also include at least one motion sensor 20 that is adapted to detect and transmit information that is indicative of the motion of the patient 14. In one embodiment, the motion sensor 20 may be embodied as a belt-type motion sensor 22 that is adapted to extend at least partially around the patient 14. Optionally, the motion sensor 20 may be embodied as a motion sensor 24 that is adapted to be secured to a predetermined position on the patient 14. It should be realized that although two different motion sensors 20 are described, the imaging system 10 may include other types of motions sensors 20 to generate motion related information of the patient 14.

The imaging system 10 also includes an operator workstation 30. During operation, the motorized table 18 moves the patient 14 into the central opening 16 of the gantry 12 in response to one or more commands received from the operator workstation 30. The workstation 30 then operates both the gantry 12 and the table 18 to both scan the patient 14 and acquire emission data 40 of the patient 14. The workstation 30 may be embodied as a personal computer (PC) that is positioned near the imaging system 10 and hard-wired to the imaging system 10 via a communication link 32. The workstation 30 may also be embodied as a portable computer such as a laptop computer or a hand-held computer that transmits information to, and receives information from, the imaging system 10. Optionally, the communication link 32 may be a wireless communication link that enables information to be transmitted to or from the workstation 30 to the imaging system 10 wirelessly. In operation, the workstation 30 is configured to control the operation of the imaging system 10 in real-time. The workstation 30 is also programmed to perform medical image diagnostic acquisition and reconstruction processes described herein.

In the illustrated embodiment, the operator workstation 30 includes a central processing unit (CPU) or computer 34, a display 36, and an input device 38. As used herein, the term "computer" may include any processor-based or microprocessor-based system including systems using microcontrollers, reduced instruction set computers (RISC), application specific integrated circuits (ASICs), field programmable gate array (FPGAs), logic circuits, and any other circuit or processor capable of executing the functions described herein. The above examples are exemplary only, and are thus not intended to limit in any way the definition and/or meaning of the term "computer". In the exemplary embodiment, the computer 34 executes a set of instructions that are stored in one or more storage elements or memories, in order to process information, such as the emission dataset 40, received from the detector 512. The storage elements may also store data or other information as desired or needed. The storage element may be in the form of an information source or a physical memory element located within the computer 34.

In operation, the computer 34 connects to the communication link 32 and receives inputs, e.g., user commands, from the input device 38. The input device 38 may be, for example, a keyboard, mouse, a touch-screen panel, and/or a voice recognition system, etc. Through the input device 38 and associated control panel switches, the operator can control the operation of the PET imaging system 10 and the positioning of the patient 14 for a scan. Similarly, the operator can control the display of the resulting image on the display 36 and can perform image-enhancement functions using programs executed by the computer 34.

The imaging system 10 also includes a reference gate selection module 50 that is configured to implement various methods described herein. The module 50 may be implemented as a piece of hardware that is installed in the computer 34. Optionally, the module 50 may be implemented as a set of instructions that are installed on the computer 34. The set of instructions may be stand-alone programs, may be incorporated as subroutines in an operating system installed on the computer 34, may be functions in an installed software package on the computer 34, and the like. It should be understood that the various embodiments are not limited to the arrangements and instrumentality shown in the drawings.

The set of instructions may include various commands that instruct the module 50 and/or the computer 34 as a processing machine to perforin specific operations such as the methods and processes of the various embodiments described herein. The set of instructions may be in the form of a non-transitory computer readable medium. As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Figure 2:
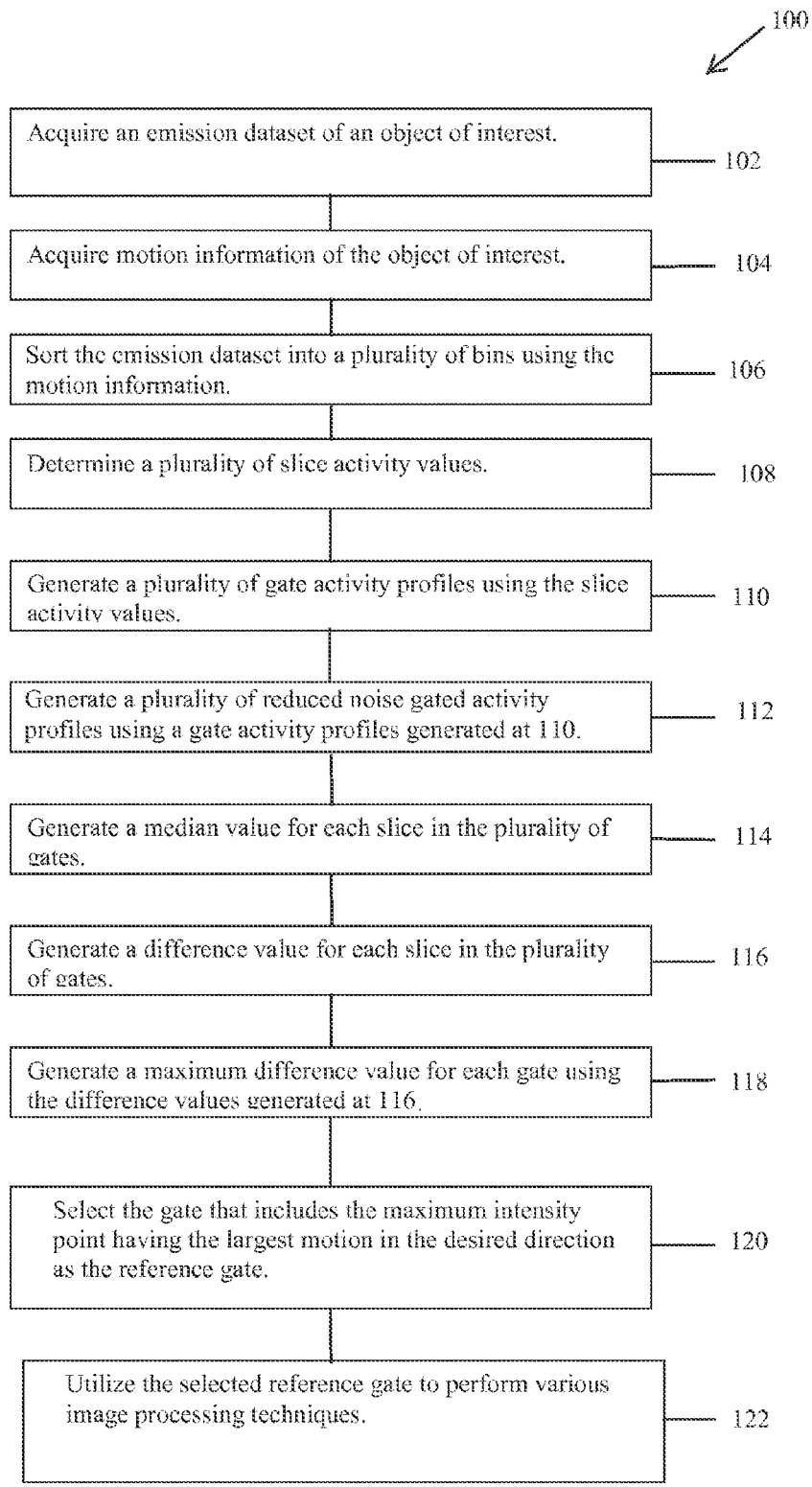
FIG. 2 is a flowchart illustrating a method for selecting a reference gate in accordance with various embodiments.

FIG. 2 is a simplified block diagram of an exemplary method 100 that may be performed by the imaging system 10 shown in FIG. 1. In various embodiments, the method 100 may be utilized to automatically select a reference gate that, in various embodiments, may then be utilized to perform motion correction on the emission dataset 40. In the exemplary embodiment, the method 100 may be implemented using the reference gate selection module 50. More specifically, the method 100 may be provided as a non-transitory machine-readable medium or media having instructions recorded thereon for directing the computer 34 and/or the reference gate selection module 50 to perform an embodiment of the methods described herein. The medium or media may be any type of CD-ROM, DVD, floppy disk, hard disk, optical disk, flash RAM drive, or other type of computer-readable medium or a combination thereof.

Referring to FIG. 2, at 102 an emission dataset, such as the emission dataset 40 (shown in FIG. 1) is acquired. In the exemplary embodiment, the emission dataset 40 may be acquired using the PET imaging system 10 (shown in FIG. 1). The emission dataset 40 may be acquired by performing a scan of the patient 14 to produce the emission dataset 40. Optionally, the emission dataset 40 may be acquired from data collected during a previous scan of the patient 14, wherein the emission dataset 40 has been stored in a memory, such as the memory device 550 (shown in FIG. 8). The emission dataset 40 may be stored in any format, such as a list mode dataset, for example. The emission dataset 40 may be acquired during real-time scanning of the patient 14. For example, the methods described herein may be performed on emission data as the emission data is received from the PET imaging system 10 during a real-time examination of the patient 14.

Figure 3:
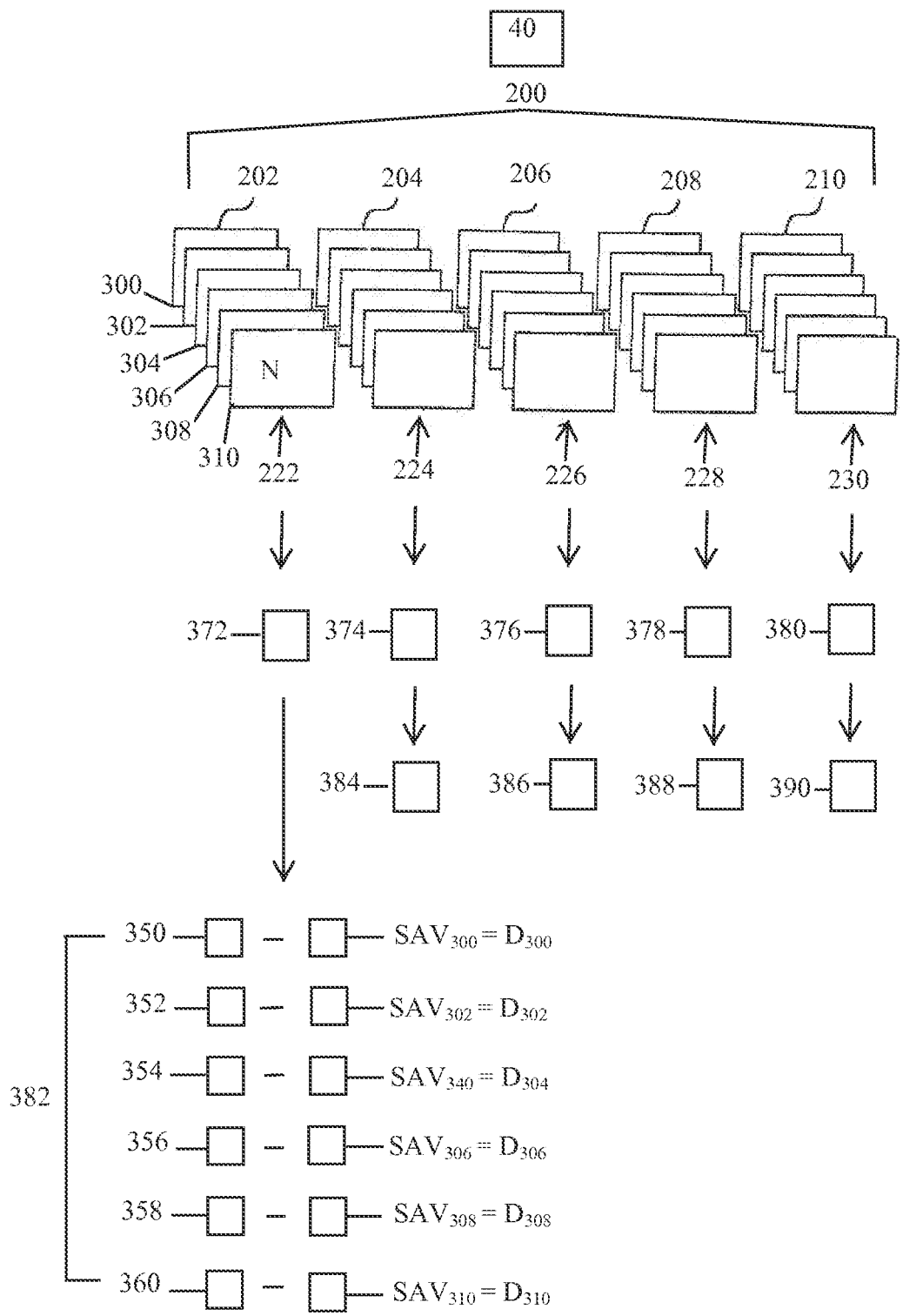
FIG. 3 is a block diagram of a plurality of gates that may be generated in accordance with various embodiments.

At 104, information indicative of motion of the patient 14 is acquired. The motion information may be acquired during a real-time scan of the patient, during a related PET imaging scan, or during any other medical imaging system scanning procedure. Optionally, the motion information may be acquired from a database of previous medical examination information or may be derived from other data acquired during the scan, such as the raw emission data. In various embodiments, the motion information is acquired using the motion sensor 20 shown in FIG. 1. Optionally, the motion information may be acquired from information saved in a memory device located in the computer 34. In the exemplary embodiment, the motion information is representative of the motion, or the expected motion, of the patient 14 within a selected volume of interest At 106, the emission dataset 40 is sorted into a plurality of bins or gates 200. For example, FIG. 3 is a simplified block diagram illustrating a plurality of gates 200 numbered 202, 204, 206, 208, and 210, i.e. n=5 gates. Thus, in the illustrated embodiment, the emission dataset 40 is sorted into the five gates 202, 204, 206, 208, and 210. However, it should be realized that the quantity of gates 200 illustrated in FIG. 3 is exemplary, and that during operation, fewer than five gates 200 or more than five gates 200 may be utilized. As such, in the illustrated embodiment, each of the gates 202, 204, 206, 208, and 210 includes approximately ⅕ of the total information in the emission dataset 40.

More specifically, assume that the total length of the emission dataset 40 obtained at 102 is three minutes. Moreover, assume that the emission dataset 40 is sorted into five gates 200. Accordingly, each respective gate 200 includes approximately thirty-six seconds of information. Thus a first portion 222 of the emission dataset 40 is sorted into the gate 202, a second portion 224 of the emission dataset 40 is sorted into the gate 204, a third portion 226 of the emission dataset 40 is sorted into the gate 206, a fourth portion 228 of the emission dataset 40 is sorted into the gate 208, and a fifth portion 230 of the emission dataset 40 is sorted into the gate 210.

In the exemplary embodiment, the emission dataset 40 is sorted into a respective gate 200 based on the motion information obtained of the patient 14. Information to determine the motion state of the patient 14 may be acquired from, for example, from the motion sensor 20 as described above. In operation, the gate 202 may include emission dataset acquired at the beginning of a respiration phase, and the gate 210 may include emission dataset 40 acquired at the end of the respiration phase. Moreover, each intervening gate, i.e. the gates 204, 206, and 208 may include emission data that represents a motion state between inspiration and expiration. More specifically, each of the gates 200 is adapted to receive emission data that was acquired over a plurality of breathing cycles. Accordingly, each of the gates 200 is adapted to receive emission data that represents approximately the same point in the patient's breathing cycle. As a result, each of the gates 200 includes emission data representing a certain motion state of the patient 14. In the illustrated embodiment, the motion information acquired from the motion sensor 20 is utilized to divide the emission dataset 40 into five substantially equal portions and store the substantially equal portions in a respective gate 202, 204, 206, 208, and 210. In various other embodiments, the emission dataset 40 may also be sorted into the gates 200 using cardiac motion, patient motion, etc. Thus, at the conclusion of the sorting process at 106 a plurality of gates 200 are formed wherein each respective gate 200 includes a plurality of 2D images or slices that collectively form a 3D image dataset that is not motion corrected.

Referring again to FIG. 2, at 108, a slice activity value (SAV) is determined for each slice in each gate 200. As used herein, a slice activity value is a summation of the total activity concentration for a respective axial image slice. For example, and referring again to FIG. 3, in the illustrated embodiment, the gate 202 includes N slices numbered 300, 302, 304, 306, 308 . . . n. Accordingly, to calculate a slice activity value for the slice 300, for example, the intensity values for each of the pixels in the slice 300 are summed and then divided by the quantity of pixels forming the slice 300 in accordance with:

$$SAV_{300} = \frac{I_{P1} + I_{P2} + I_{P3} + I_n}{Q_P} \qquad \text{Equation 1}$$

where I is an intensity value of a single pixel in the slice 300 and $Q_P$ is the total quantity of pixels forming the slice 300. For example, assume that the slice 300 includes 1000 pixels, i.e. $Q_P$=1000. Accordingly, $$SAV_{300} = \frac{I_{P1} + I_{P2} + I_{P3} + I_n}{1000}.$$

In the exemplary embodiment, a SAV is calculated for each slice in the gate 202. Thus, because the gate 202 includes N slices, $N_{SAVs}$ are calculated for the gate 202, wherein N is the quantity of slices in the gate 202. Additionally, slice activity values are also generated for each slice in the remaining gates 204, 206, 208, and 210 as described above with respect to gate 202. It should be realized that while axial images are commonly generated in imaging systems 10, that in various embodiments, the method may be adapted to non-orthogonal images whose per-slice image normal vectors are substantially in the scanner axial direction (along the patient axis head-to-foot).

Figure 4:
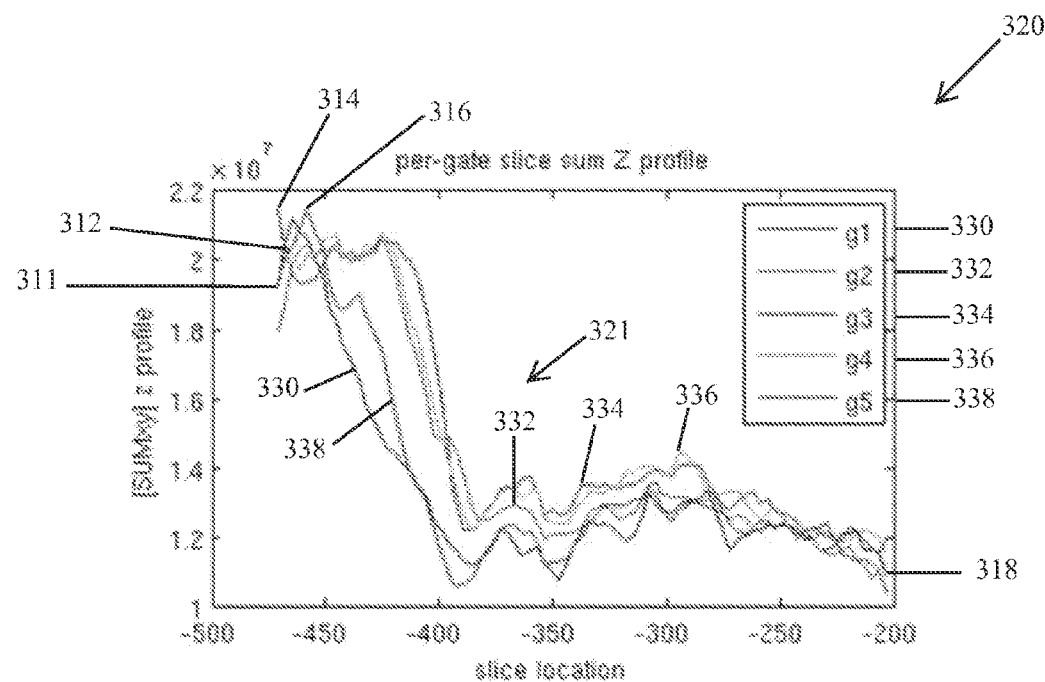
FIG. 4 is a graphical illustration of a plurality of gate activity profiles that may be generated in accordance with various embodiments.

Referring again to FIG. 2, at 110, the SAVs calculated at 108 are utilized to generate a gate activity profile (GAP) 321, shown in FIG. 4, for each gate 202 . . . 210 in the plurality of gates 200. FIG. 4 is a graphical image 320 of a plurality of GAPs 321 that may be generated at 110. In the illustrated embodiment, the x axis of the image 320 represents the axial location of the slice, the y-axis represents the SAV for the specific slice at that axial location, and each line represents a plot or profile of the SAVs for an individual gate. Accordingly, it should be realized that each GAP 321 is formed from a plurality of SAVs for a particular gate. For example, in the illustrated embodiment, an exemplary GAP 330 may be generated for the gate 202 using the plurality of SAVs generated for the gate 202 at 108. Accordingly, in various embodiments, the GAP 330 may include a point 311 that represents the SAV for the slice 300, a point 312 that represents the SAV for the slice 302, a point 314 that represents the SAV for the slice 304, a point 316 that represents the SAV for the slice 306, and a point 318 that represents the SAV for the nth slice in the gate 202. In the illustrated embodiment, the SAVs for each slice in the gate 202 may then be plotted or graphed to form the GAP 330 that graphically represents the SAVs for each of the slices in the gate 202 in relation to the axial location of the slice.

Moreover, it should be realized that a separate GAP is generated for each gate 200 in a similar manner as discussed above with respect to gate 202. Accordingly, at 110, a GAP 332 may be generated for the gate 204, a GAP 334 may be generated for the gate 206, a GAP 336 may be generated for the gate 208, and a GAP 338 may be generated for the gate 210. It should be realized that the GAPs shown in FIG. 4 are presented to further explain various embodiments described herein. Thus, in various embodiments, the module 50 may calculate the various GAPs which may or may not be presented visually to the user.

Figure 5:
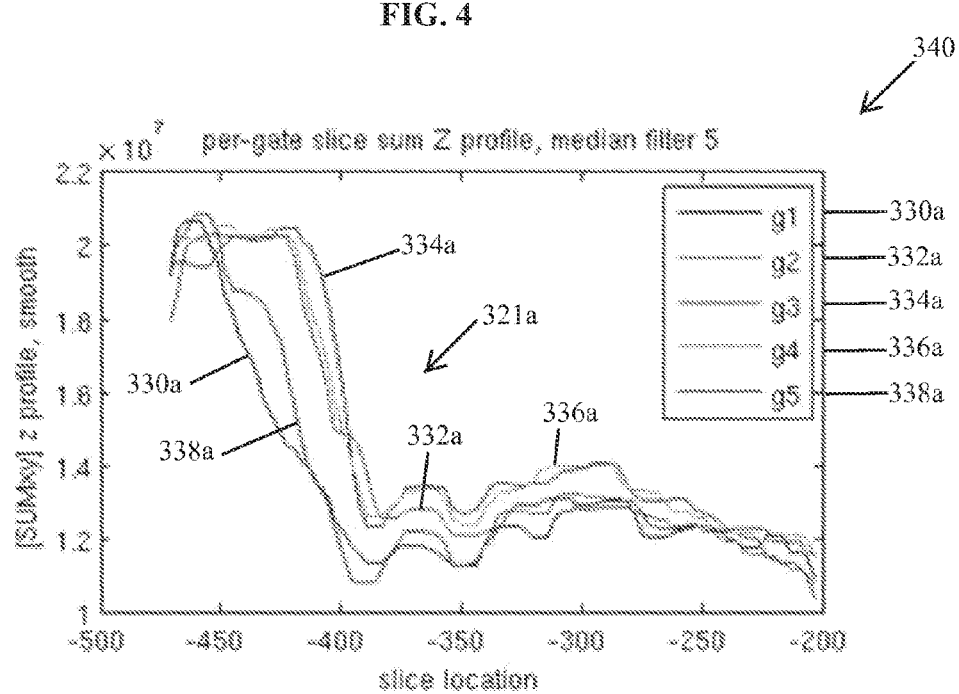
FIG. 5 is a graphical illustration of another plurality of gate activity profiles that may be generated in accordance with various embodiments.

Referring again to FIG. 2, in various embodiments at 112, the GAPs 321 calculated at 110 may be filtered to reduce and/or eliminate noise to generate a plurality of smoothed GAPs 321a. For example, FIG. 5 is a graphical image 340 of a plurality of GAPs 321a after being smoothed using a filter. In the illustrated embodiment, a GAP 330a represents the GAP 330 after being subjected to a smoothing filter. A GAP 332a represents the GAP 332 after filtering. A GAP 334a represents the GAP 334 after filtering. A GAP 336a represents the GAP 336 after filtering and a GAP 338a represents the GAP 338 after filtering. It should be realized that the filtering described at 112 is optional and that the various methods described herein may be implemented using filtered or unfiltered GAPs.

Accordingly, at 112, for each gate 200, a GAP 321, slice sum, or z-slice profile, is calculated and plotted as a function of where in the patient 14 the slice is located, i.e. head to foot, foot to head, etc. In use, the GAP's 321 enable a user to determine which GAP 321 has an edge that is located the most in one direction, i.e. the superior direction or the inferior direction. More specifically, because the user is aware of the location of the patients head and feet, the GAPs 321 may be utilized to visually display which particular gate 200 of all the gates shows when the activity was shifted most in the head direction, which correlates to when the patient 14 breathed out the most while this particular data was being acquired at this time.

Referring again to FIG. 2, at 114 a median value of the SAVs is generated for each slice in each of the gates 200. In various embodiments, the median value is generated using the emission dataset 40, i.e. the ungated emission data. More specifically, the median value represents a median pixel intensity value for each slice over the gates 200. For example, and referring again to FIG. 3, as discussed above, the gate 202 includes N slices numbered 300, 302, 304, 308, 310 . . . n. Accordingly, at 114 a median value 350 is calculated using the slice 300 and all equal-location slices in gates 204, 206, 208 and 210; a median value 352 is calculated for the slice 302 and its counterparts in other gates, a median value 354 is calculated for the slice 304 and its counterparts in other gates, a median value 356 is calculated for the slice 306 and its counterparts in other gates, a median value 358 is calculated for the slice 308 and its counterparts in other gates, and a median value 360 is calculated for the nth slice 310 and its counterparts in other gates. Thus the median values 350 . . . 360 form a set 372 of median values across all the gates 200. In various embodiments, the set of median values on a per-slice basis may be plotted on an exemplary image, such as the image 42 shown in FIG. 1. In various other embodiments, at 114, a mean value of the SAYS is generated for each slice in each of the gates 200. The method 100 may then be implemented as described above using the mean value in place of the median value described.

Referring again to FIG. 2, at 116, a difference value (D) for each of the gates 200 is generated for each slice. In various embodiments, the difference value is generated by subtracting the median value calculated at 114 from the SAV calculated at 108. For example, assume that the median value of the slice 300 shown in FIG. 3 is y and the SAV of the slice 300 is x, the resultant difference value (D) of the slice 300 is then x-y=$D_{300}$. More specifically, $D_{300}$ represents the difference between the median intensity of the slice 300 and the SAY previously calculated for the slice 300. Additionally, a difference value $D_{302}$ is generated for slice 302, a difference value $D_{304}$ is generated for slice 304, a difference value $D_{306}$ is generated for slice 306, a difference value $D_{308}$ is generated for slice 308, and a difference value $D_{310}$ is generated for slice 310. In the illustrated embodiment, the difference values $D_{300}$, $D_{302}$, $D_{304}$, $D_{306}$, $D_{308}$, and $D_{310}$, represent a set 382 of difference values calculated for the gate 202. In operation, a set 384 of difference values is calculated for the gate 204, a set 386 of difference values is calculated for the gate 206, a set 388 of difference values is calculated for the gate 208, and a set 390 of difference values is calculated for the gate 210.

Figure 6:
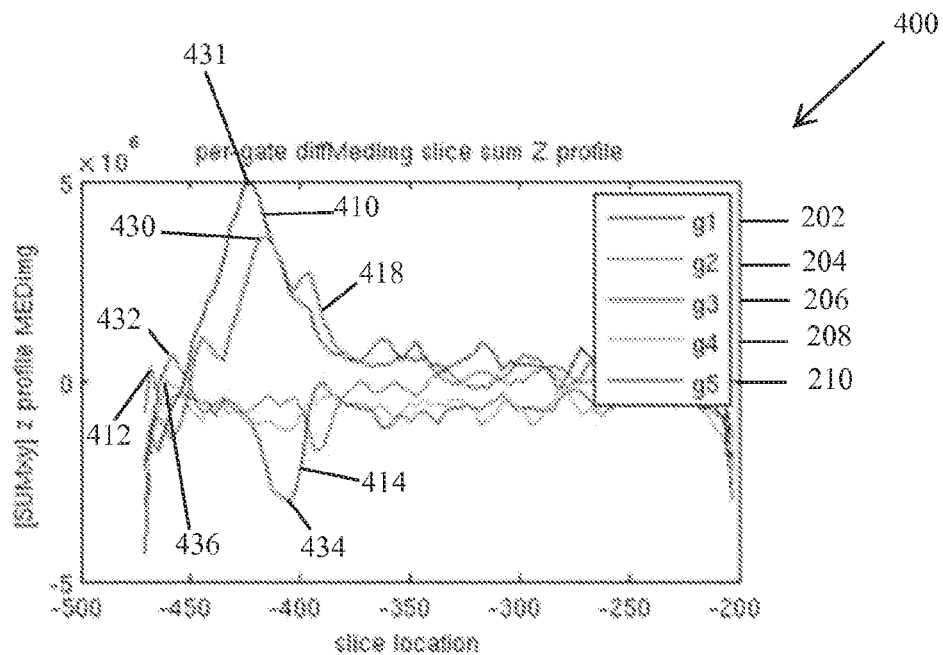
FIG. 6 is a graphical illustration of a plurality of difference values that may be generated in accordance with various embodiments.

In various embodiments, each set of difference values may be plotted on an exemplary image, such as an image 400 shown in FIG. 6 wherein the x axis is the slice location and the y axis is the difference values. Accordingly, in the illustrated embodiment, the image 400 include a line 410 that represents the set 372 of difference values for the gate 202, a second line 412 that represents the set 374 of difference values for the gate 204, a third line 414 that represents the set 376 of difference values for the gate 206, a fourth line 416 that represents the set 378 of difference values for the gate 208, and a fifth line 418 that represents the set 380 of difference values for the gate 210. Accordingly, at 116, a difference at each slice location for each gate is calculated.

Figure 7:
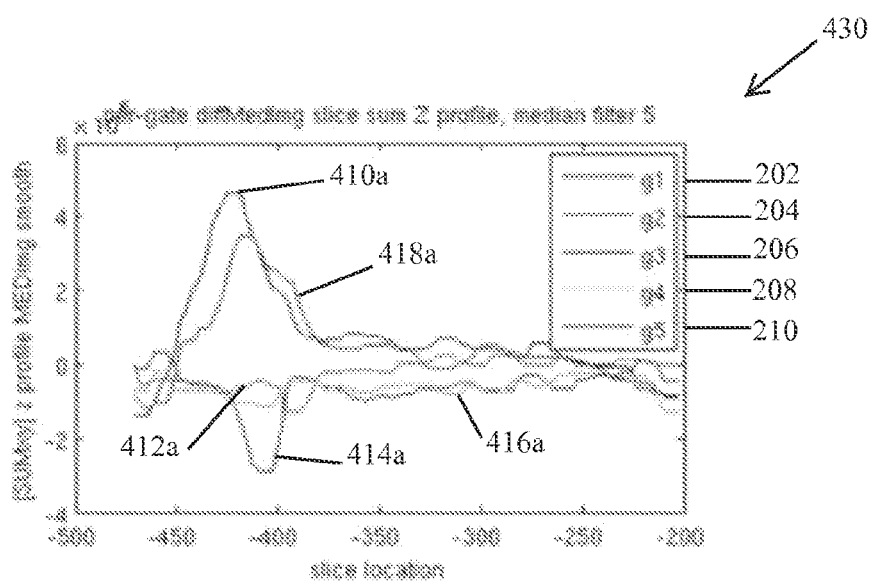
FIG. 7 is a graphical illustration of another plurality of difference values that may be generated in accordance with various embodiments.

In various embodiments, the difference values calculated 116 may be filtered to reduce and/or eliminate noise to generate a plurality of difference value plots. For example, FIG. 7 is a graphical image 430 of a plurality of difference plots after being smoothed using a filter. In the illustrated embodiment, a line 410a represents the line 410 after being subjected to the smoothing filter, a line 412a represents the line 412 after being subjected to a smoothing filter, a line 414a represents the line 414 after being subjected to the smoothing filter, a line 416a represents the line 416 after being subjected to the smoothing filter, and a line 418a represents the line 418 after being subjected to the smoothing filter. It should be realized that the filtering described at 116 is optional and that the various methods described herein may be implemented using filtered or unfiltered difference value plots.

Referring again to FIG. 2, at 118 a maximum difference value is determined for each of the difference profiles plotted in FIG. 6. In various embodiments, the maximum difference value may be determined manually by the user viewing the smoothed or filtered difference profiles shown in FIG. 7. For example, and referring again to FIG. 6, the user may select a point 431 to represent the maximum difference value for the line 410 which represents the difference values calculated for the gate 202 as described above. Similarly, the user may select a point 432 to represent the maximum difference value for the line 412 which represents the difference values calculated for the gate 204, a point 434 to represent the maximum difference value for the line 414 which represents the difference values calculated for the gate 206, a point 436 to represent the maximum difference value for the line 416 which represents the difference values calculated for the gate 208, and a point 438 to represent the maximum difference value for the line 418 which represents the difference values calculated for the gate 210. Accordingly, at 118 n maximum difference values are determined, one maximum difference value for each of the gates 200.

The maximum difference values represent the slice, and the location of the slice, in each gate wherein the motion difference from the motion median is the largest during the image acquisition procedure. Moreover, the maximum difference value may be either a positive or a negative number as shown in FIG. 6. For example, in operation, the methods described herein enable the user, or the module 50, to identify the location of a slice which includes the maximum absolute difference value as determined above. The various methods or the module 50 facilitate identifying which of the maximum absolute difference values calculated at 118 is most to the right in the image 400. More specifically, the various embodiments described herein enable the user to identify which maximum difference value is located most in the head direction which in the illustrated embodiment, the right direction on the image 400 which in the exemplary embodiment, can indicate the point at which the patient 14 is exhaling or is at the end of expiration phase of breathing. Thus, because the movement of the patient 14, during imaging, is greatest in the superior-inferior direction, i.e. along the z-axis, the methods described herein enable the peak of the motion in the superior-inferior direction to be determined as described above. Accordingly, in various embodiments, the motion may be measured in various directions to determine the maximum motion in the given direction. In the illustrated embodiment, the motion in the superior-inferior direction is determined. Accordingly, and referring again to FIG. 6, the user may determine that the maximum difference value that is located nearest the superior location of the data, i.e. nearest the head, is represented by the point 438 which indicates that that this specific slice in the gate 210 has the largest motion in the superior direction. In various other embodiments, the slope of the lines in the FIG. 6 may be calculated and the line-segment of constant-slope having the most superior position may be identified as the gate having the largest motion in the superior direction. Accordingly, at 120, the gate that includes the maximum intensity point having the largest motion in the desired direction is selected as the reference gate. It should be realized that the reference gate may be selected manually by the user as described above. Optionally, the reference gate may be automatically selected by the module 50. Further, the method may be implemented to identify maximum-inspiration as the most inferior position of the maximum difference.

At 122, the selected reference gate may be utilized to perform various image processing techniques. In various embodiments, the reference gate selected at 120 may be utilized to perform motion correction on the emission data 40. For example, assume that the gate 210 is selected as the reference gate. Accordingly, at 122 a global non-rigid registration of the gates 200 may be performed to motion correct the PET images. In operation, the global non-rigid registration generates transformations on a gate-to-gate basis of the non-rigid registration between all gates not identified as the reference gate. Global non-rigid may be performed in image space. The non-rigid registration may be performed manually by the operator or automatically by the computer 34 or the module 50. It should be realized, that registration may not be required in certain areas where there is little or no motion.

In the exemplary embodiment, performing a non-rigid registration includes transforming the information within the gates 200, in three-dimensional (3D) space to align the information within the gates 200 with respect to a reference gate. To perform the non-rigid registration, at least one of the gates is selected as a reference gate and the remaining gates are then registered one-by-one to the reference gate. In various embodiments, the gate 210 is selected as the reference gate as described above. The remaining gates 202, 204, 206 and 208 are then registered with the reference gate 210. The non-rigid registration or elastic registration may also include non-rigid transformations. These non-rigid transformations allow local warping of image features and provide registrations that account for local deformations. Non-rigid transformation approaches include, for example, polynomial warping, interpolation of smooth basis functions (thin-plate splines and wavelets), and physical continuum models (viscous fluid models and large deformation diffeomorphisms). Accordingly, in various embodiments, a plurality of transformation matrices may be generated to perform the non-rigid registration described above.

Figure 8:
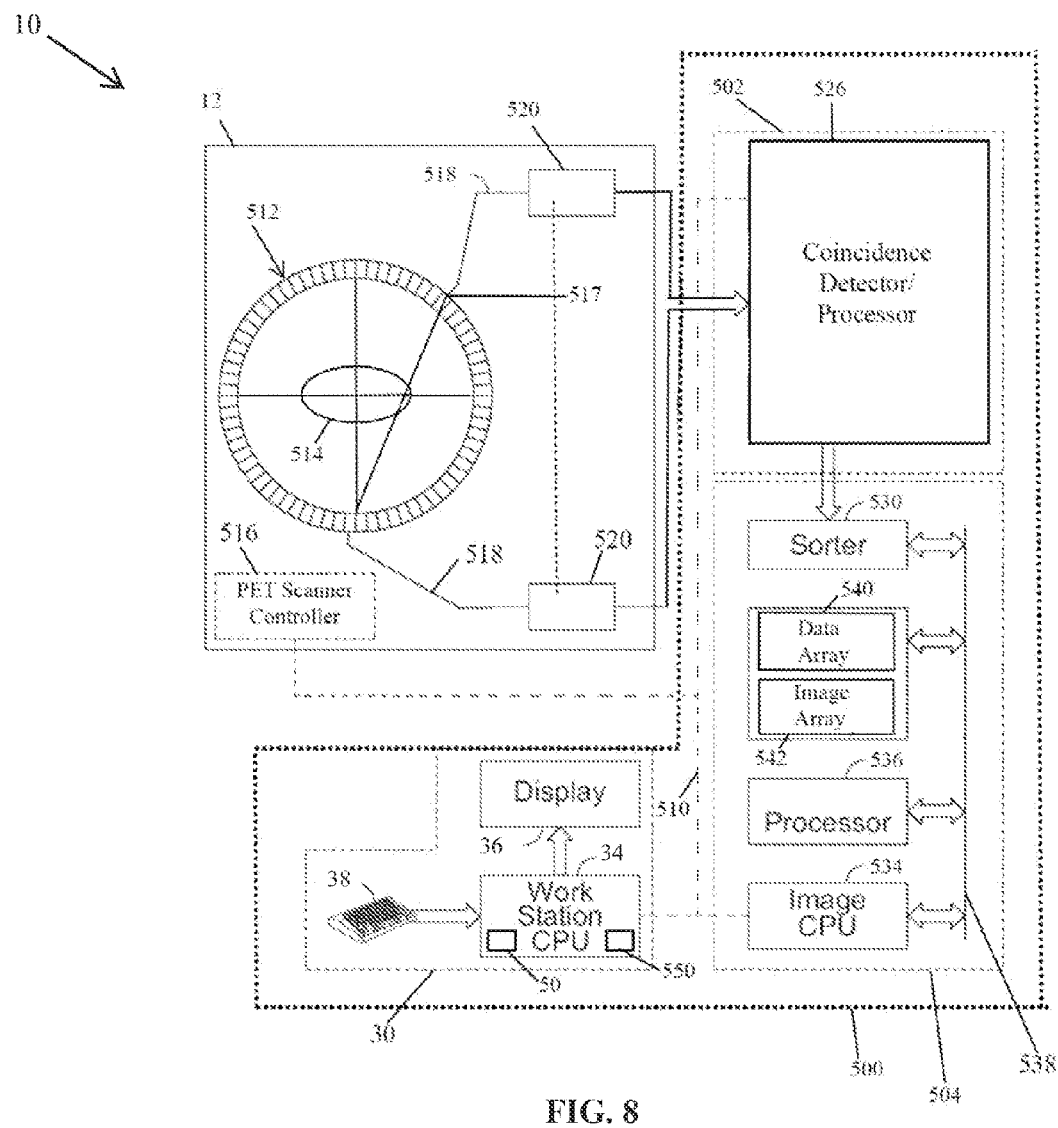
FIG. 8 is a block schematic diagram of a portion of the imaging system illustrated in FIG. 1.

FIG. 8 is a schematic block diagram of the imaging system 10 (shown in FIG. 1). As described above, the imaging system 10 is embodied as a PET imaging system and includes the gantry 12. The PET imaging system 10 also includes a controller 500 to control image reconstruction processes. The controller 500 includes the operator workstation 30. As described above, the operator workstation 30 includes the computer 34, the display 36 and the input device 38. The controller 500 includes a data acquisition processor 502 and an image reconstruction processor 504. The gantry 12, the operator workstation 30, the data acquisition processor 502 and the image reconstruction processor 504 are interconnected via a communication link 510 (e.g., a serial communication or wireless link). In operation, scan data is acquired and transmitted to the data acquisition processor 502. The data acquired by data acquisition processor 502 is reconstructed using image reconstruction processor 504.

The PET imaging system 10 may include, for example, a plurality of detector rings. One such detector ring, detector ring 512, is illustrated in FIG. 8. The detector ring 512 includes a central opening, in which an object 514 (e.g., the patient 14) may be positioned, using, for example, the motorized table 18. The motorized table 18 moves the object 514 into the central opening of detector the ring 512, in response to one or more commands received from operator workstation 30. A PET scanner controller 516, also referred to as a gantry controller, is provided (e.g., mounted) in the gantry 12. The PET scanner controller 516 responds to the commands received from the operator workstation 30 through the communication link 510. Therefore, the operation of the PET imaging system 10 is controlled from the operator workstation 30 through the PET scanner controller 516.

In various embodiments, the detector ring 512 includes a plurality of detector elements for performing a PET scan of the object 514. For example, there may be 420 crystals per ring and 24 rings in the scanner. As shown in FIG. 8, the detector ring 512 includes a first detector element 517, a second detector element 519, and several other detectors. It should be noted that the detector elements are referred to as the first detector element and the second detector element, only to differentiate location in FIG. 8. The first detector element 517, like the other detectors, includes a set of scintillator crystals arranged in a matrix that is disposed in front of a plurality of photosensors. When a photon collides with a crystal on a detector, the photon produces a scintilla on the crystal. Each photosensor produces an analog signal on a communication line 518 when a scintillation event occurs. A set of acquisition circuits 520 is provided to receive these analog signals. The acquisition circuits 520 include analog-to-digital converters to digitize analog signals, processing electronics to quantify event signals and a time measurement unit to determine time of events relative to other events in the system. For example, this information indicates when the event took place and the identity of the scintillation crystal that detected the event. The acquisition circuits 520 produce digital data indicating the location, time and total energy of the event. This event data is transmitted through a communication link, for example, a cable, to a coincidence detector or processor 526.

The coincidence detector 526 receives the event data packets from the acquisition circuits 520 and determines if any two of the detected events are in coincidence. In this context, the coincidence is determined by a number of factors. First, the time markers in each event data packet must be within a predetermined time period, for example, 6 ns, of each other. Secondly, the LOR formed by a straight line joining the two detectors that detect the coincidence event should pass through the field of view in detector 512. Events that cannot be paired are discarded. Coincident event pairs are recorded as a coincidence data packet that is communicated through a communication link to a sorter 530 in the image reconstruction processor 504.

The image reconstruction processor 504 includes the sorter 530, a memory module 532, an image CPU 534, an array processor 536, and a back-plane bus 538. The sorter 530 counts all events that occur along each projection ray and organizes them into a coincidence data set. In one embodiment, this data set is organized as a data array 540, referred to as a sinogram. The data array 540 is stored in the memory module 532. The back-plane bus 538 is linked to the communication link 510 through the image CPU 534, which controls communication through the back-plane bus 538. The array processor 536 is also connected to the back-plane bus 538, receives the data array 540 as an input, and reconstructs images in the form of the image arrays 542. The resulting image arrays 542 are stored in the memory module 532.

The images stored in the image array 542 are communicated by the image CPU 534 to the operator workstation 30. The computer 34 is configured to process the scan data received from the detector elements. The scan data includes, for example, sinogram and timing information that is received by controller 500 from the detector elements during an imaging scan. The timing information in one embodiment is the difference in time at which two photons emitted in an annihilation event are detected by detector elements. The timing information may include time stamp information relating to a measured photon event detected by a pair of detector elements, for example, the first detector element 517 and the second detector element 519, for the PET system 10. The time stamp information is the time at which each photon is detected by a detector element, which in various embodiments.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. While the dimensions and types of materials described herein are intended to define the parameters of the various embodiments, they are by no means limiting and are merely exemplary. Many other embodiments will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments, including the best mode, and also to enable any person skilled in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A method for selecting a reference gate, said method comprising:
   acquiring a four-dimensional (4D) emission dataset of an object of interest;
   sorting the 4D emission dataset into a plurality of gates;
   calculating a slice activity value for each slice in the plurality of gates;
   generating a maximum difference value for each gate using the plurality of slice activity values; and
   selecting a reference gate based on the locations of the maximum difference values.

2. The method of claim 1, further comprising performing a motion correction of the 4D emission dataset using the reference gate.

3. The method of claim 1, wherein calculating a slice activity value comprises:
   determining an intensity value for each pixel in a slice;
   summing the pixel intensity values; and
   dividing the summed pixel intensity values by the quantity of pixels in the slice to generate a slice activity value.

4. The method of claim 1, further comprising:
   generating a plurality of gate activity profiles using the slice activity values; and
   generating a plurality of maximum difference values using the gate activity profiles.

5. The method of claim 1, further comprising:
   generating a median value of the slice activity values for each slice in the plurality of gates; and
   generating a plurality of maximum difference values using the plurality of median values.

6. The method of claim 1, further comprising:
   generating a difference value for each slice in the plurality of gates; and
   generating a plurality of maximum difference values using the plurality of difference values.

7. The method of claim 1, further comprising:
   determining a median pixel intensity value for each slice;
   subtracting the median pixel intensity value from the slice activity value to generate a difference value; and
   using the difference value to generate the maximum intensity difference values.

8. The method of claim 1, further comprising:
   identifying the maximum difference value having the largest motion in a predetermined direction; and
   selecting the gate having the identified maximum difference value as the reference gate.

9. An imaging system comprising:
   a detector; and
   a computer coupled to the detector, the computer being programmed to:
   acquire a four-dimensional (4D) emission dataset of an object of interest;
   sort the 4D emission dataset into a plurality of gates;
   calculate a slice activity value for each slice in the plurality of gates;
   generate a maximum difference value for each gate using the plurality of slice activity values; and
   select a reference gate based on the locations of the maximum difference values.

10. The imaging system of claim 9, wherein the computer is further programmed to perform a motion correction of the 4D emission dataset using the reference gate.

11. The imaging system of claim 9, wherein the computer is further programmed to
   determine an intensity value for each pixel in a slice;
   sum the pixel intensity values; and
   divide the summed pixel intensity values by the quantity of pixels in the slice to generate a slice activity value.

12. The imaging system of claim 9, wherein the computer is further programmed to
   generate a plurality of gate activity profiles using the slice activity values; and
   generate a plurality of maximum difference values using the gate activity profiles.

13. The imaging system of claim 9, wherein the computer is further programmed to
   generate a median value of the slice activity values for each slice in the plurality of gates; and
   generate a plurality of maximum difference values using the plurality of median values.

14. The imaging system of claim 9, wherein the computer is further programmed to
   generate a difference value for each slice in the plurality of gates; and
   generate a plurality of maximum difference values using the plurality of difference values.

15. The imaging system of claim 9, wherein the computer is further programmed to
   determine a median pixel intensity value for each slice;
   subtract the median pixel intensity value from the slice activity value to generate a difference value; and
   use the difference value to generate the maximum intensity difference values.

16. The imaging system of claim 9, wherein the computer is further programmed to
   identify the maximum difference value having the largest motion in a predetermined direction; and
   select the gate having the identified maximum difference value as the reference gate.

17. A non-transitory computer readable medium encoded with a program programmed to instruct a computer to:
   acquire a four-dimensional (4D) emission dataset of an object of interest;
   sort the 4D emission dataset into a plurality of gates;
   calculate a slice activity value for each slice in the plurality of gates;
   generate a maximum difference value for each gate using the plurality of slice activity values; and
   select a reference gate based on the locations of the maximum difference values.

18. The non-transitory computer readable medium of claim 17, further programmed to instruct a computer to:
   determine an intensity value for each pixel in a slice;
   sum the pixel intensity values; and
   divide the summed pixel intensity values by the quantity of pixels in the slice to generate a slice activity value.

19. The non-transitory computer readable medium of claim 17, further programmed to instruct a computer to:
   generate a plurality of gate activity profiles using the slice activity values; and
   generate a plurality of maximum difference values using the gate activity profiles.

20. The non-transitory computer readable medium of claim 17, further programmed to instruct a computer to:
   generate a median value of the slice activity factors values for each slice in the plurality of gates; and
   generate a plurality of maximum difference values using the plurality of median values.

* * * * *